United States Patent
Hirano et al.

(10) Patent No.: US 11,791,695 B2
(45) Date of Patent: Oct. 17, 2023

(54) ELECTRIC ACTUATOR

(71) Applicant: NTN Corporation, Osaka (JP)

(72) Inventors: Shinsuke Hirano, Shizuoka (JP);
Yoshinori Ikeda, Shizuoka (JP);
Tatsunori Shimizu, Shizuoka (JP)

(73) Assignee: NTN CORPORATION, Osaka (JP)

( * ) Notice: Subject to any disclaimer, the term of this patent is extended or adjusted under 35 U.S.C. 154(b) by 527 days.

(21) Appl. No.: 16/972,730

(22) PCT Filed: Jun. 24, 2019

(86) PCT No.: PCT/JP2019/024962
§ 371 (c)(1),
(2) Date: Dec. 7, 2020

(87) PCT Pub. No.: WO2020/004330
PCT Pub. Date: Jan. 2, 2020

(65) Prior Publication Data
US 2021/0257886 A1 Aug. 19, 2021

(30) Foreign Application Priority Data

Jun. 29, 2018 (JP) ................................. 2018-124566

(51) Int. Cl.
*H02K 11/01* (2016.01)
*H02K 11/215* (2016.01)
(Continued)

(52) U.S. Cl.
CPC ......... *H02K 11/0141* (2020.08); *F16H 57/02* (2013.01); *G01D 5/145* (2013.01);
(Continued)

(58) Field of Classification Search
CPC .. H02K 11/0141; H02K 11/215; F16H 57/02; G01D 5/145
See application file for complete search history.

(56) References Cited

U.S. PATENT DOCUMENTS

2010/0319477 A1 12/2010 Tateishi et al.
2019/0107184 A1 4/2019 Matsuto et al.
(Continued)

FOREIGN PATENT DOCUMENTS

| JP | 5243018 | 7/2013 |
|---|---|---|
| JP | 2017-184478 | 10/2017 |
| JP | 2017-184481 | 10/2017 |

OTHER PUBLICATIONS

International Preliminary Report on Patentability and Written Opinion of the International Searching Authority dated Dec. 29, 2020 in International (PCT) Application No. PCT/JP2019/024962.
(Continued)

*Primary Examiner* — Robert W Horn
(74) *Attorney, Agent, or Firm* — Wenderoth, Lind & Ponack, L.L.P.

(57) ABSTRACT

An electric actuator 1 includes a motor 5 and a motion conversion mechanism 4 that converts a rotary motion generated by driving the motor 5 into a predetermined motion. A magnet 31 as a sensor target is disposed on a movable part performing a predetermined motion, and magnetic sensors 32 detecting position information of the magnet 31 is disposed around the magnet 31. A magnetic shield plate 34 is disposed between the motor 5 and the magnetic sensors 32, and an outer surface 5e of the motor 5 and an inner surface 34a of the magnetic shield plate 34 face each other with a predetermined gap 35 therebetween.

19 Claims, 6 Drawing Sheets

(51) Int. Cl.
*F16H 57/02* (2012.01)
*G01D 5/14* (2006.01)
*H02K 7/06* (2006.01)
*F16H 25/22* (2006.01)
*F16H 25/20* (2006.01)

(52) U.S. Cl.
CPC ............ *H02K 7/06* (2013.01); *H02K 11/215* (2016.01); *F16H 25/2204* (2013.01); *F16H 2025/2031* (2013.01); *F16H 2025/2081* (2013.01); *F16H 2057/02034* (2013.01); *F16H 2057/02082* (2013.01)

(56) References Cited

U.S. PATENT DOCUMENTS

2020/0300344 A1 9/2020 Matsuto et al.
2021/0257886 A1* 8/2021 Hirano .................. G01D 5/145

OTHER PUBLICATIONS

International Search Report dated Sep. 10, 2019 in International (PCT) Application No. PCT/JP2019/024962.

* cited by examiner

ELECTRIC ACTUATOR

TECHNICAL FIELD

The present invention relates to an electric actuator.

BACKGROUND ART

In recent years, motorization has progressed in order to save labor and reduce fuel consumption of vehicles. For example, a system for operating an automatic transmission, a brake, a steering wheel, and the like of an automobile by power of an electric motor such as a motor has been developed and released on the market. There is known, as an actuator used for such an application, an electric actuator using a ball screw mechanism that converts a rotary motion generated by driving an electric motor into a linear motion (see, for example, Patent Literature 1).

Further, in this type of actuator, it is important to control a stroke amount or a position in a stroke direction of an operation unit (that is, an actuator head) that outputs the linear motion. As a means for detecting the stroke amount or the position in the stroke direction, for example, there has been proposed an electric actuator provided with a magnet as a sensor target on an actuator head and provided with a magnetic sensor capable of contactlessly detecting a position of the magnet in a linear motion direction around the actuator head (see, for example, Patent Literature 2).

CITATIONS LIST

Patent Literature

Patent Literature 1: JP 5243018 B2
Patent Literature 2: JP 2017-184478 A

SUMMARY OF INVENTION

Technical Problems

As described above, by adopting a method of detecting position information of the actuator head with the magnet and the magnetic sensor, it is possible to provide an expandable and contractable boot around the actuator head in order to prevent, for example, foreign matter from entering from external air. This type of boot usually includes resin or the like, and therefore a detector including the magnet and the magnetic sensor has an advantage of being able to accurately detect the position information of the actuator head even when the boot is present.

On the other hand, when the magnet and the magnetic sensor are used to detect the position of the actuator head, there is a concern about an influence of the magnetic field generated from the motor. That is, when the magnetic sensor is used, there is a possibility that the magnetic field to be originally detected from the sensor target cannot be detected accurately because if there is a ferromagnetic substance other than the sensor target (magnet) around the magnetic sensor, the magnetic sensor may be affected by the magnetic field generated from the ferromagnetic substance. Thus, when this type of ferromagnetic substance is disposed, the ferromagnetic substance is to be disposed away from around the magnetic sensor. However, related components are to be disposed close to each other in order to miniaturize the electric actuator. In order to achieve both the miniaturization of the electric actuator and highly accurate position control of the actuator head, a new configuration is to be made in which the ferromagnetic substance other than the sensor target can be disposed around the magnetic sensor.

In view of the above circumstances, a technical problem to be solved by the present invention is to control a position of an actuator head with high accuracy while miniaturizing an electric actuator.

Solutions to Problems

The above problem can be solved by an electric actuator of the present invention. That is, this electric actuator includes a motor, and a motion conversion mechanism configured to convert a rotary motion generated by driving the motor into a predetermined motion, in which the motion conversion mechanism has a movable part configured to perform a predetermined motion, the movable part is provided with a magnet as a sensor target, and a magnetic sensor configured to detect position information of the magnet is disposed around the magnet, a magnetic shield plate is disposed between the motor and the magnetic sensor, and an outer surface of the motor and an inner surface of the magnetic shield plate face each other with a predetermined gap therebetween.

As described above, in the present invention, the magnet as the sensor target is disposed on the movable part, the magnetic sensor is disposed around the magnet, and the magnetic shield plate is provided between the motor for driving the electric actuator and the magnetic sensor. The magnetic shield plate, which is disposed in this way, blocks magnetism generated from the motor in front of the magnetic sensors. This makes it possible to accurately detect the magnetic field that the magnetic sensor is to originally detect (magnetic field generated from the magnet as the sensor target) and detect position information of the movable part without malfunction. Further, in the present invention, the outer surface of the motor and the inner surface of the magnetic shield plate face each other with a predetermined gap therebetween. According to Coulomb's law, the farther away from a magnetic substance, the smaller a magnitude (magnetic flux density) of the magnetic field generated from the magnetic substance. Specifically, the magnitude of the magnetic field is inversely proportional to the square of a distance from the magnetic substance. This limits a space to be left around the motor and can remarkably enhance a magnetic blocking effect even if only a significantly small gap (for example, of about 1 mm to several mm) can be provided between the motor and the magnetic shield plate as compared with a case where the magnetic shield plate is disposed in close contact with the motor. It is therefore possible to effectively reduce the influence of the magnetic field generated from the motor on the magnetic sensor even in an environment in which the components are disposed close to each other.

Further, in the electric actuator of the present invention, the magnetic shield plate may have a cylindrical shape.

The magnetic shield plate configured in this way allows the magnetic shield plate to cover an entire periphery of the motor. In this case, the magnetic shield plate can form a magnetic circuit closed together with the motor as a type of yoke, thereby minimizing a possibility that the magnetic field generated in the motor may leak to the outside of the motor. It is therefore possible to reliably eliminate the influence of the magnetic field on the magnetic sensor and to achieve more accurate position detection.

Further, the electric actuator of the present invention may further include a rotary motion transmitter configured to transmit the rotary motion from the motor to the motion conversion mechanism, in which the motor may accommodate a first case and the rotary motion transmitter may accommodate a second case, the first case and the second case being fixed to each other, and the magnetic shield plate may be fixed to an inner periphery of the first case, and one axial end of the motor is fixed to the second case.

In this way, the magnetic shield plate is fixed to the inner periphery of the first case accommodating the motor, and the one axial end of the motor is fixed to the second case fixed to the first case and accommodating the rotary motion transmitter. This makes it possible to easily maintain a positional relationship in which the predetermined gap is provided between the outer surface of the motor and the inner surface of the magnetic shield plate. The above configuration is effective in particular when a distance between the components is shortened to miniaturize the electric actuator.

Further, in the electric actuator of the present invention, the first case accommodating the motor and a third case accommodating the magnetic sensor are integrated, and the first case fixing the magnetic shield plate to the inner periphery of the first case partially faces an internal space of the third case accommodating the magnetic sensor.

In this way, the first case and the third case are configured such that the first case fixing the magnetic shield plate to the inner periphery of the first case partially faces an internal space of the third case accommodating the magnetic sensor. This makes it possible to shorten a distance between the motor and the magnetic sensor as much as possible to miniaturize the electric actuator, and eliminate the influence of the magnetic field from the motor on the magnetic sensor by the magnetic shield plate disposed between the motor and the magnetic sensor.

Further, in the electric actuator of the present invention, the first case may be an injection molded resin product having the magnetic shield plate as an insert.

The first case having the above configuration can omit the attachment of the magnetic shield plate to the first case. Further, the magnetic shield plate can be integrated while being embedded in the inner periphery of the first case, which is suitable for arranging the magnetic shield plate and the motor in a limited space with the gap therebetween.

Further, the magnetic shield plate, which has a cylindrical shape, may have a slit axially extending in the electric actuator of the present invention. In this case, the slit may be disposed at a position offset in a circumferential direction from a position between the motor and the magnetic sensor facing each other.

For example, when the magnetic shield plate is manufactured separately from the first case accommodating the motor, the magnetic shield plate having a cylindrical shape is provided with the slit in the axial direction. The magnetic shield plate with its diameter reduced is introduced to the inner periphery of the first case, and then enlarging the diameter of the magnetic shield plate allows the magnetic shield plate to be easily fitted to the inner peripheral surface of the first case. Alternatively, for example, when the first case is integrally molded with resin using the magnetic shield plate as an insert, the slit is disposed such that a circumferential position of the slit coincides with a relatively thin-walled part, thereby improving a flow of a molten resin in the thin-walled part. This can improve moldability of the first case. Further, in any of the above cases, the slit is disposed at the position offset in the circumferential direction from the position between the motor and the magnetic sensor facing each other, thereby minimizing a possibility that the magnetic field generated from the motor may leak toward the magnetic sensor through the slit. Therefore, there is no fear of the magnetic blocking effect of the motor as a whole being affected by arranging the slit.

Advantageous Effects of Invention

As described above, the present invention makes it possible to control the position of the actuator head with high accuracy while miniaturizing the electric actuator.

DESCRIPTION OF EMBODIMENTS

Figure 1:
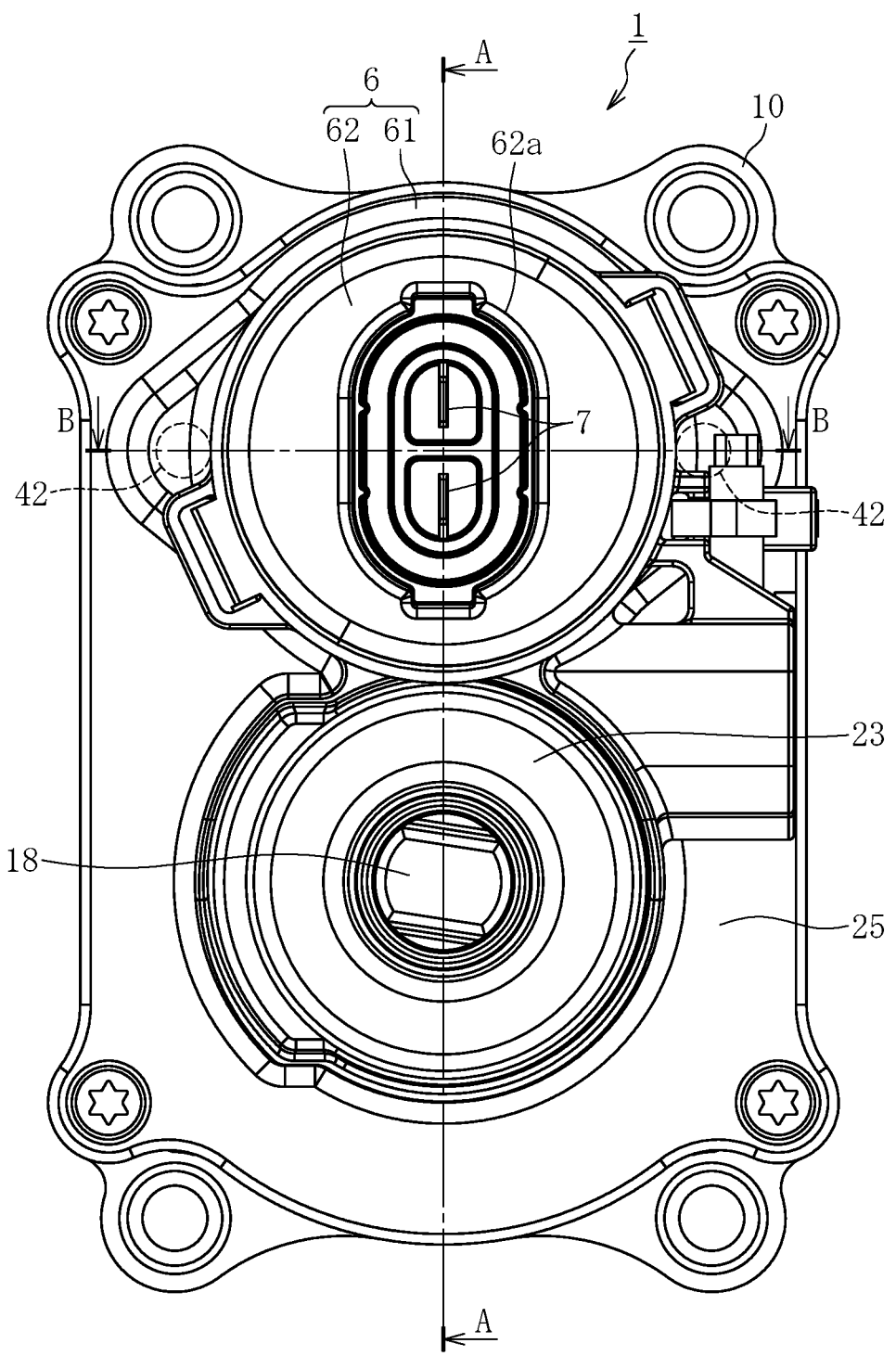
FIG. 1 is a side view of an electric actuator according to a first embodiment of the present invention.

Hereinafter, the present invention will be described with reference to the accompanying drawings. In each of the drawings for explaining the present invention, components such as members and parts having the same function or shape are given the same reference numerals as far as the components are distinguishable from each other, and the description thereof will be omitted after being described once.

Figure 2:
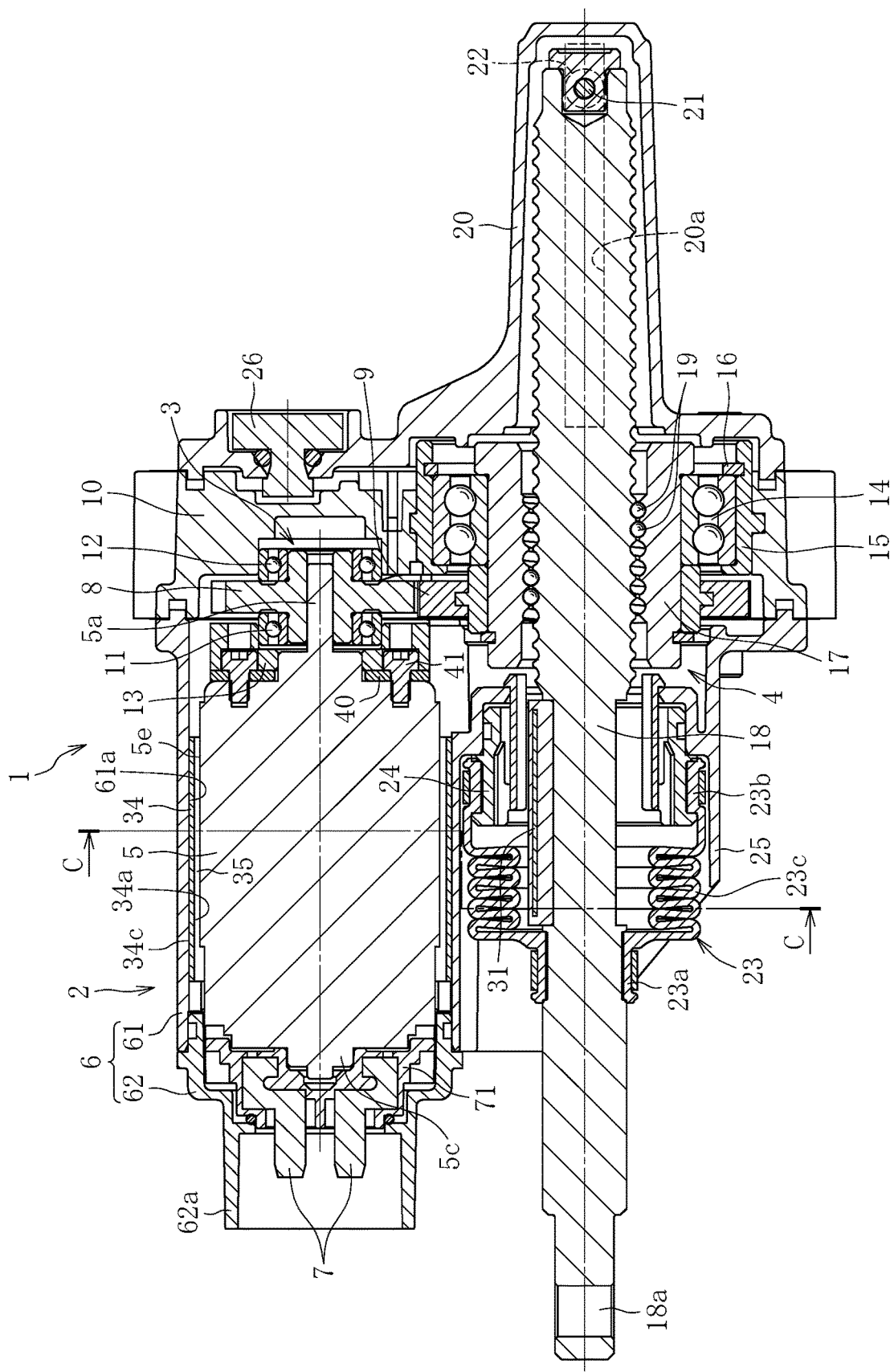
FIG. 2 is a vertical sectional view of a cross section taken along line A-A in FIG. 1 as viewed from a direction of arrow A.

FIG. 1 is a side view of an electric actuator 1 according to a first embodiment of the present invention. FIG. 2 is a vertical sectional view of the electric actuator 1 shown in FIG. 1. As shown in FIG. 2, the electric actuator 1 according to the present embodiment mainly includes a motor section 2 having a motor 5, a rotary motion transmitter 3 that transmits a rotary motion of the motor 5, a motion conversion mechanism 4 that converts the rotary motion of the motor 5 into a linear motion.

The motor section 2 includes the motor 5, a pair of bus bars 7 as conductive members supplying electric power to the motor 5, and a motor case 6 accommodating the motor 5 and the pair of bus bars 7. This motor case 6 corresponds to a first case of the present invention. Although not shown in the drawings, the motor 5 includes a motor rotor and a motor stator facing each other in a radial direction, and a motor housing accommodating the motor rotor and the motor stator. As the motor 5, an inexpensive DC motor (with a brush) may be used, or another motor such as a brushless motor may be used.

In the present embodiment, the motor case 6 includes a cylindrical body 61 accommodating most part of the motor 5, and a lid-shaped cap 62 fixed to one end (left end in FIG. 2) of the body 61. Each bus bar 7 is formed by bending a metal plate member into a predetermined shape, and is held by a resin holder 71. Further, the bus bars 7 are connected to motor terminals 5d (see FIG. 3) of the motor 5 by welding with the holder 71, for example, fitted and fixed to a rear end 5c (end opposite to an end from which a rotary shaft 5a protrudes) of the motor 5. The cap 62 is provided with a cylindrical connector 62a that protrudes in an axial direction, and a tip (end on a side opposite to a side connected to the motor terminals 5d) of each bus bar 7 is disposed on an inner periphery of the connector 62a. A terminal at the other end of the power line extending from a power source (not shown) is connected to the tip of each bus bar 7, and the power source can supply electric power to the motor 5. A magnetic shielding structure of the motor case 6 and the motor 5 will be described later.

The rotary motion transmitter 3 includes a drive gear 8 on a drive side and a driven gear 9 on a driven side that meshes with the drive gear 8. The drive gear 8 and the driven gear 9 are accommodated in a gear case 10. This gear case 10 corresponds to a second case of the present invention. In the present embodiment, the drive gear 8 is a small-diameter gear having fewer teeth than the driven gear 9, and is attached to a rotary shaft 5a of the motor 5 so as to rotate integrally with the rotary shaft 5a. On the other hand, the driven gear 9 is a large-diameter gear having more teeth than the drive gear 8, and is attached to a nut 17 described later that configures the motion conversion mechanism 4 so as to rotate integrally with the nut 17.

Further, the drive gear 8 is rotatably supported by two bearings 11 and 12 at both ends of the drive gear 8 in the axial direction. Of the two bearings 11 and 12, one bearing 11 (on the left in FIG. 2) is held by being fitted into a cylindrical bearing holding member 13 fixed to the end of the motor 5, and the other bearing 12 (on the right in FIG. 2) is held by being fitted into the gear case 10. The driven gear 9 is rotatably supported together with the nut 17 by a double-row bearing 14 provided on an outer peripheral surface of the nut 17. The double-row bearing 14 is accommodated in a cylindrical sleeve 15 provided in the gear case 10, and an axial movement of the double-row bearing 14 is restricted by a retaining ring 16 attached to the inner peripheral surface of the sleeve 15. As the double-row bearing 14, a double-row angular contact ball bearing capable of supporting an axial load in both directions in addition to a radial load is preferably used so as to be able to support the nut 17 stably and reliably.

With the rotary motion transmitter 3 having the above configuration, when the motor 5 starts driving and the rotary shaft 5a of the motor 5 rotates, the drive gear 8 rotates integrally with the rotary shaft 5a, and the driven gear 9 rotates in conjunction with this rotation. At this time, the rotary motion from the motor 5 is transmitted from the drive gear 8 having fewer teeth to the driven gear 9 having more teeth, which reduces speed and increases a rotational torque. In this way, by increasing the rotational torque by decelerating between the drive gear 8 and the driven gear 9 and outputting the rotational torque, a sufficient output can be obtained by using a small motor. In the above embodiment, a case where the rotary motion transmitter 3 also has a deceleration function is illustrated. However, for example, a deceleration mechanism (not shown) may be provided between the motor section 2 and the rotary motion transmitter 3 separately from the rotary motion transmitter 3 to transmit a decelerated rotation of the motor 5 to the rotary motion transmitter 3. Alternatively, when the deceleration is not required, the drive gear 8 and the driven gear 9 may be configured with gears having the same number of teeth, and the rotary motion from the motor 5 may be transmitted without deceleration.

The motion conversion mechanism 4 is a ball screw mechanism including the nut 17 as a rotating member, a screw shaft 18 as a linear motion member, and multiple balls 19. In this case, the screw shaft 18 corresponds to a movable part of the present invention. Spiral grooves are formed on an inner peripheral surface of the nut 17 and an outer peripheral surface of the screw shaft 18, and the balls 19 are rollably accommodated between the spiral grooves. Further, the nut 17 is provided with a circulation member (not shown), and the balls 19 are configured to circulate along the spiral grooves by the circulation member.

The screw shaft 18 is inserted through an inner periphery of the nut 17 and is disposed parallel to the rotary shaft 5a of the motor 5. A connection hole 18a is provided at a front end (left end in FIG. 2) of the screw shaft 18, and by inserting a fastener such as a bolt into the connection hole 18a, the screw shaft 18 and a corresponding part of an apparatus as an operation target (not shown) are connected to each other. In this case, the front end of the screw shaft 18 having the connection hole 18a corresponds to an actuator head of the electric actuator 1. Then, when the rotary motion of the motor 5 is transmitted to the nut 17 via the drive gear 8 and the driven gear 9, the nut 17 rotates to move the screw shaft 18 in one axial direction (forward or backward). On the contrary, when the motor 5 rotates in a reverse direction, the rotary motion is transmitted to the nut 17 via the drive gear 8 and the driven gear 9 to move the screw shaft 18 to the other axial direction. In this way, the forward or reverse rotation of the motor 5 causes the screw shaft 18 to move forward or backward, and thus the operation target connected to the front end of the screw shaft 18 is operated.

A rear end of the screw shaft 18 (end opposite to the end where the operation target is connected) is covered with a screw shaft case 20. The screw shaft case 20 is fixed to the gear case 10 on a position opposite to a position where the motor case 6 is fixed to the gear case 10.

Further, at the rear end of the screw shaft 18, a detent pin 21 is provided as a rotation restricting member that restricts a rotation of the screw shaft 18. The detent pin 21 is attached to the screw shaft 18 in a direction orthogonal to or intersecting the axial direction of the screw shaft 18. Guide rollers 22 are rotatably attached to both ends of the detent pin 21 protruding from the rear end of the screw shaft 18 in an outer diameter direction. The guide rollers 22 are inserted into a pair of guide grooves 20a provided in the screw shaft case 20 and extending in the axial direction. In response to the axial movement of the guide roller 22 along the guide groove 20a, the screw shaft 18 moves forward or backward in the axial direction without rotating in the peripheral direction.

Further, a boot 23 preventing foreign matter from entering the electric actuator 1 and a boot cover 25 protecting the boot 23 are provided around the screw shaft 18. In the present embodiment, the boot 23 and the boot cover 25 are provided around the screw shaft 18 closer to the front end than the nut 17. The boot 23 includes a small-diameter end 23a, a large-diameter end 23b, and bellows 23c connecting the small-diameter end 23a and the large-diameter end 23b and expanding and contracting in the axial direction. The small-diameter end 23a is fixed to the outer peripheral surface of the screw shaft 18, and the large-diameter end 23b is fixed to an outer peripheral surface of a cylindrical boot attachment member 24 attached to the boot cover 25. The boot cover 25 is disposed to cover the outside of the boot 23, and is integrally molded with the body 61 of the motor case 6.

In response to the expansion or contraction of the boot 23 due to the linear motion of the screw shaft 18, a pressure inside the boot 23 fluctuates. Thus, the bellows 23c may be excessively deformed due to the internal pressure fluctuation especially when an amount of axial movement of the screw shaft 18 is large, and then durability of the bellows 23c may decrease. In order to prevent damage to the bellows 23c due to the fluctuations in the internal pressure of the boot 23, a ventilation filter 26 is provided in the screw shaft case 20 in the present embodiment. The ventilation filter 26 communicates with an internal space of the boot 23 through the electric actuator 1. When the boot 23 expands and contracts, air flows in or out through the ventilation filter 26 to suppress the deformation of the bellows 23c.

Figure 5:
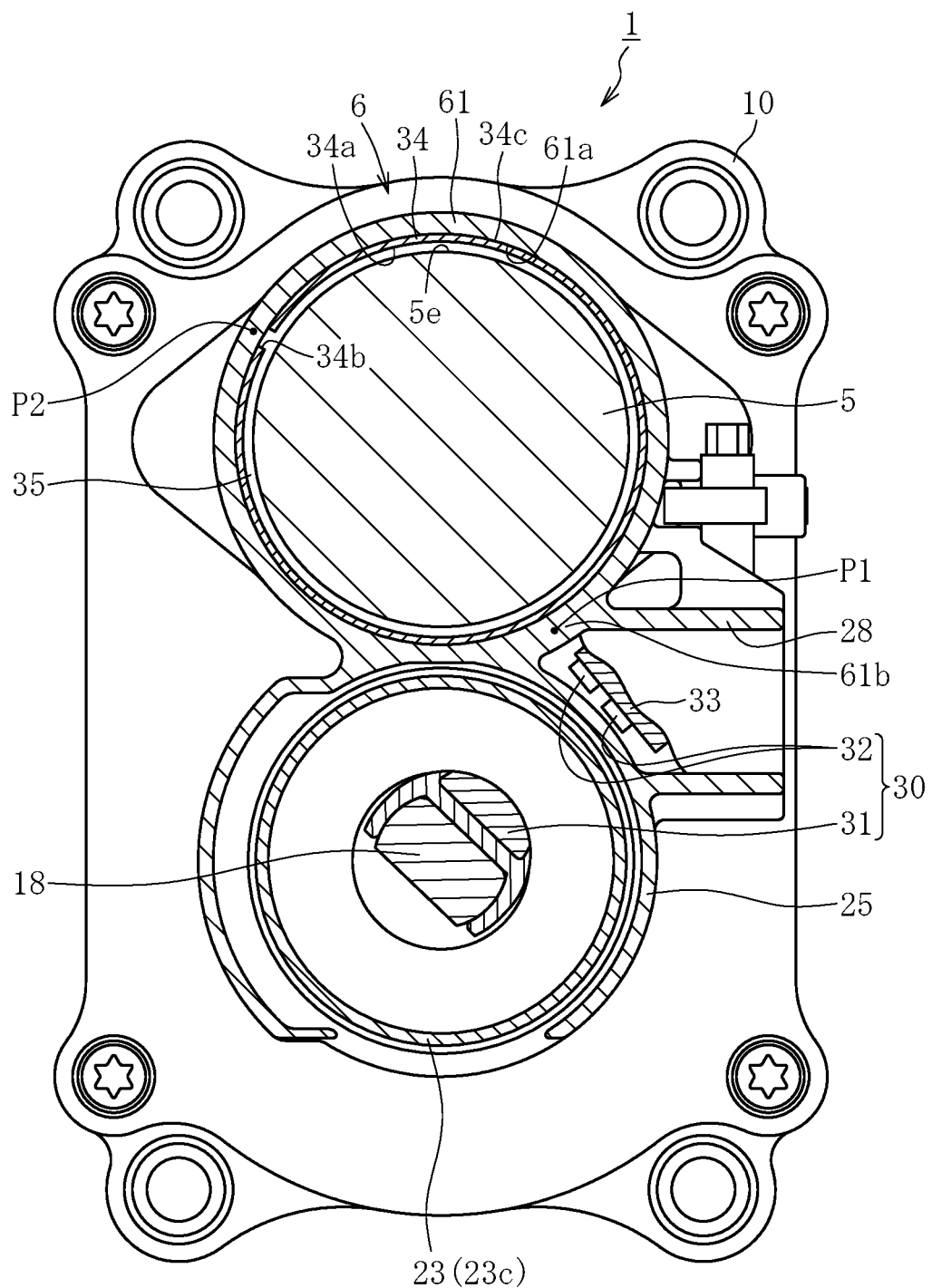
FIG. 5 is a cross sectional view of a cross section taken along line C-C in FIG. 2 as viewed from a direction of arrow C.

As shown in FIG. 5, the electric actuator 1 is equipped with a position detector 30 detecting a position of the screw shaft 18. This position detector has a permanent magnet 31 as a sensor target provided on the screw shaft 18, and magnetic sensors 32 provided around the permanent magnet 31 and detecting a position of the permanent magnet 31.

Here, the magnetic sensors 32 are accommodated in a sensor case 28. The sensor case 28 is disposed at a position adjacent to the body 61 of the motor case 6. The sensor case 28 corresponds to a third case of the present invention. In the present embodiment, as shown in FIG. 5, a sensor case 28 opening toward the outside of the motor case 6 is provided near a connection between a part of the motor case 6 in which the motor 5 is accommodated (body 61) and the boot cover 25. The sensor case 28 is integrated with the body 61 of the motor case 6. A sensor base 33 to which two magnetic sensors 32 are attached is attached to the sensor case 28. Thus, the magnetic sensors 32 face the permanent magnet 31 with the boot cover 25 therebetween. To be precise, the magnetic sensors 32 are disposed outside in a radial direction of the screw shaft 18 such that detection surfaces 32a of the magnetic sensors 32 face the permanent magnet 31 as viewed from a direction shown in FIG. 5 (stroke direction of the screw shaft 18). In this case, the magnetic sensors 32 are covered with the boot cover 25, the sensor case 28, a part 61b of the body 61 of the motor case 6, and the sensor base 33. In other words, the body 61 and the sensor case 28 are provided such that the part 61b of the body 61 faces an internal space of the sensor case 28 in which the magnetic sensors 32 are accommodated. The magnetic sensors 32 and the sensor base 33 may be attached to the sensor case 28 via a predetermined attachment part, or may be attached by sealing an opening of the sensor case 28 with resin or the like.

Further, when viewed in the stroke direction of the screw shaft 18 (permanent magnet 31), although not shown, the magnetic sensors 32 are disposed at an intermediate position in an axial direction of the boot cover 25. In this case, in terms of a positional relationship with the permanent magnet 31, the magnetic sensors 32 are preferably disposed to be positioned in the axial direction within a range of an axial movement of the permanent magnet 31 attached to the screw shaft 18.

With the position detector 30 having the above configuration, when the screw shaft 18 moves forward or backward, the magnetic sensors 32 detects a change in a magnetic field (for example, a direction and strength of a magnetic flux density) of the permanent magnet 31 that moves in accordance with the movement of the screw shaft 18. Thus, an axial position of the permanent magnet 31 and the axial position of the screw shaft 18 are detected.

Any type of magnetic sensors 32 can be used, and among them, a type of magnetic sensors such as a Hall IC or a linear Hall IC that can detect a direction and magnitude of the magnetic field by utilizing Hall effect can be favorably used.

Further, the sensor base 33, the sensor case 28, the body 61 of the motor case 6, and the boot cover 25 which cover around the magnetic sensors 32 are all preferably formed from a non-magnetic material, for example, resin.

A magnetic shield plate 34 is disposed between the motor 5 and the magnetic sensors 32 (see FIG. 5). In the present embodiment, the magnetic shield plate 34 has a cylindrical shape (see FIG. 6) and is fixed to an inner periphery of the body 61 of the motor case 6.

Further, while the magnetic shield plate 34 is fixed to the inner periphery of the motor case 6 (body 61), a predetermined radial gap 35 is maintained between an outer peripheral surface 5e of the motor 5 and an inner peripheral surface 34a of the magnetic shield plate 34. In other words, the outer peripheral surface 5e of the motor 5 and the inner peripheral surface 34a of the magnetic shield plate 34 face each other with the radial gap 35 therebetween. The radial gap 35 is filled with air as a non-magnetic substance, for example.

Figure 6:
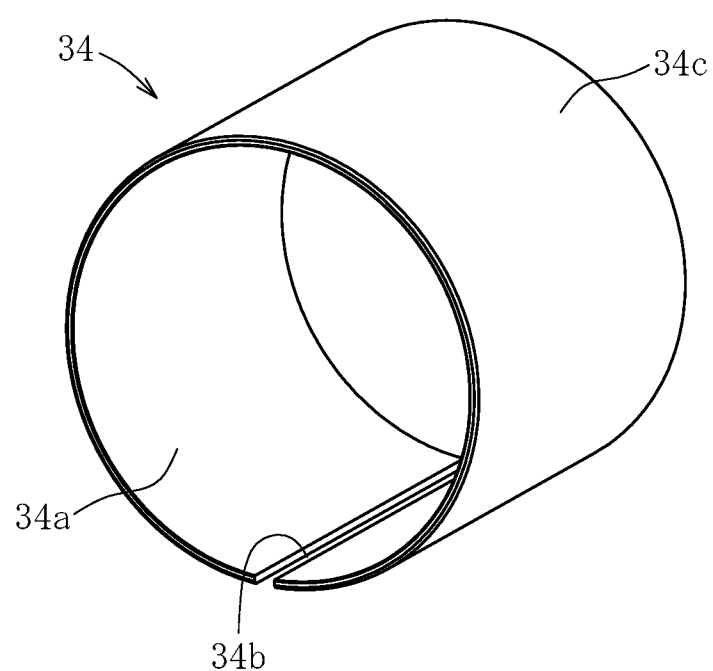
FIG. 6 is a perspective view of a magnetic shield plate shown in FIG. 2.

Further, the magnetic shield plate 34 has a slit 34b extending in the axial direction (see FIG. 6). The slit 34b is disposed at a position (for example, a position indicated by P2 in FIG. 5) offset in a circumferential direction from a position (for example, a position indicated by P1 in FIG. 5) between the motor 5 and the magnetic sensors 32 facing each other. As a result, the part 61b of the body 61 of the motor case 6 and the magnetic shield plate 34 are interposed between the motor 5 and the magnetic sensors 32.

A material of the magnetic shield plate 34 only has to be a magnetic material. However, from a viewpoint of preventing a leakage of magnetic flux to the outside of the motor 5 as much as possible, the magnetic shield plate 34 is preferably formed from a material having a high magnetic permeability such as pure iron or low carbon steel (a material forming, for example, a yoke of the motor 5).

As described above, when the magnetic shield plate 34 has a cylindrical shape and has a slit 34b extending in the axial direction, the magnetic shield plate 34 is attached to the motor case 6 as follows, for example. That is, although not shown in the drawings, the magnetic shield plate 34 is introduced from near the gear case 10 into the inner periphery of the body 61 of the motor case 6 before the motor 5 is accommodated while the magnetic shield plate 34 is reduced in diameter (the slit 34b is closed in the peripheral direction). Then, the reduced diameter of the magnetic shield plate 34 is restored to be enlarged, causing an outer peripheral surface 34c of the magnetic shield plate 34 to be in close contact with an inner peripheral surface 61a of the body 61. Thus, the magnetic shield plate 34 is fitted and fixed to the body 61 of the motor case 6.

Figure 3:
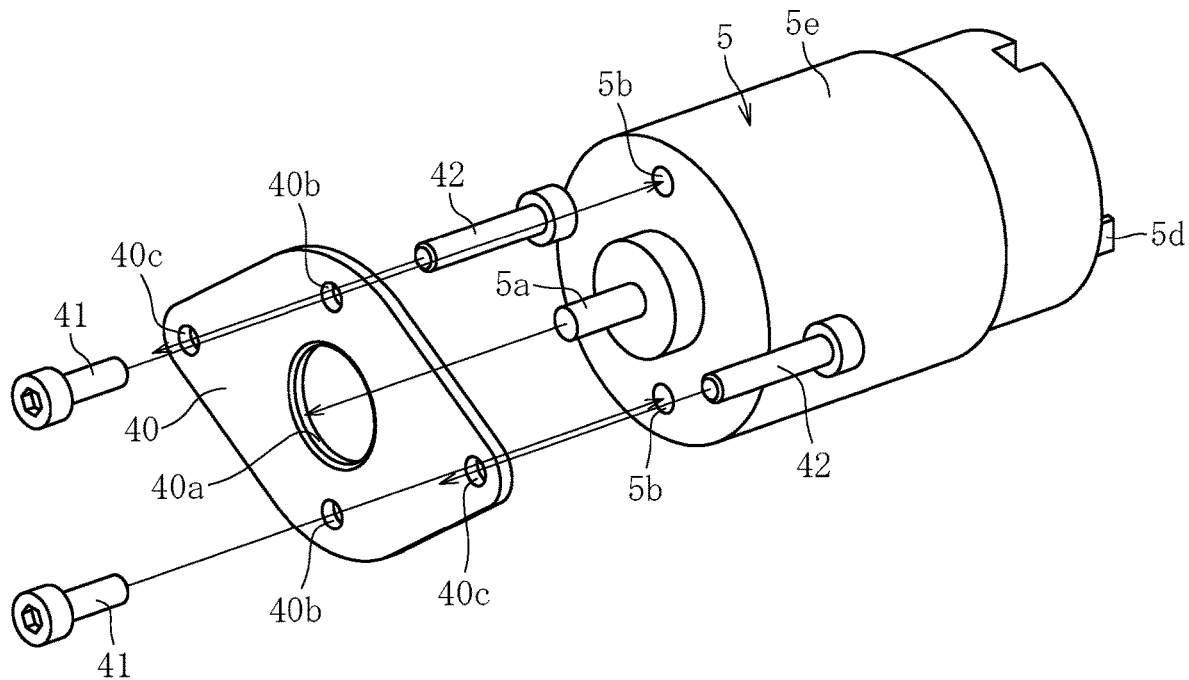
FIG. 3 is a perspective view of components configuring a support structure of a motor.
Figure 4:
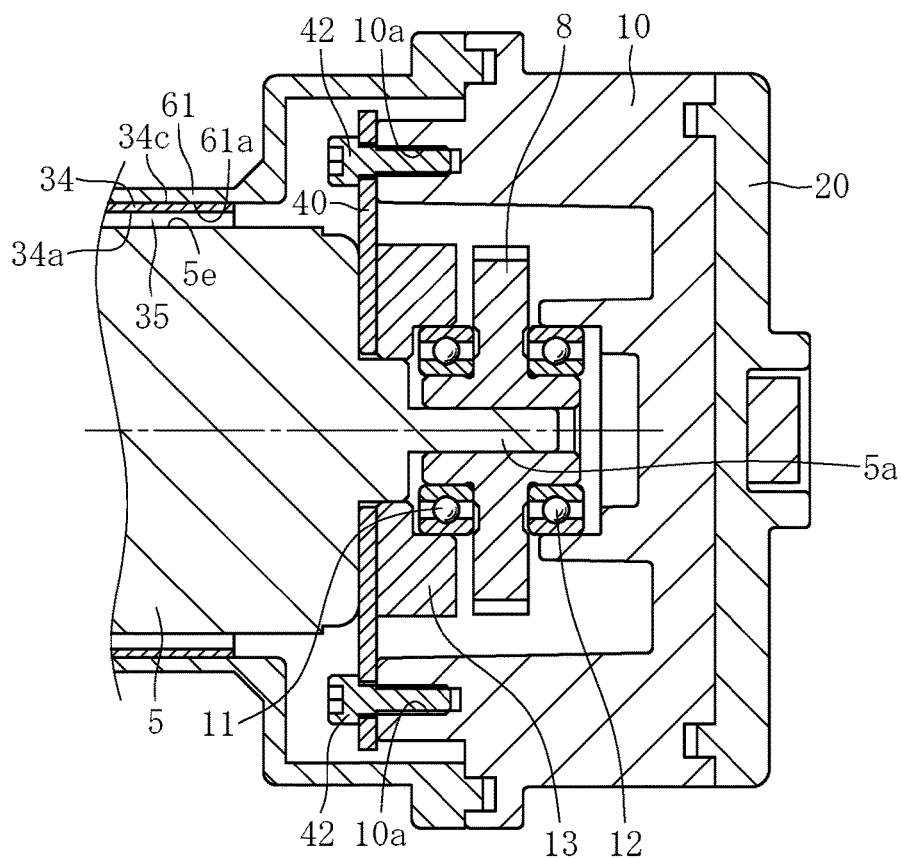
FIG. 4 is a vertical sectional view of a cross section taken along line B-B in FIG. 1 as viewed from a direction of arrow B.

Further, the motor 5 forming the radial gap 35 between the magnetic shield plate 34 and the motor 5 is fixed to the gear case 10 in the present embodiment. More specifically, as shown in FIG. 3, a plate-shaped stay 40 as a support member is fixed by two bolts 41 to an end surface of the motor 5 from which the rotary shaft 5a protrudes. A hole 40a is provided in a center of the stay 40. Two bolts 41 are screwed into screw holes 5b provided in the end surface of the motor 5 through bolt insertion holes 40b provided in the stay 40 with the rotary shaft 5a of the motor 5 inserted through the hole 40a. Thus, the stay 40 is fixed to the end surface of the motor 5. Further, the stay 40 is provided with bolt insertion holes 40c for inserting two other bolts 42. The bolts 42 are inserted through these bolt insertion holes 40c, and the bolt 42 are screwed into screw holes 10a provided in the gear case 10 as shown in FIG. 4. Thus, the stay 40 is fixed to the gear case 10. As a result, one axial end of the motor 5 (an end from which the rotary shaft 5a protrudes) is fixed to the gear case 10 via the stay 40.

As described above, in the electric actuator 1 of the present invention, the permanent magnet 31 as the sensor target is disposed on the screw shaft 18 as the movable part, and the magnetic sensors 32 are disposed around the permanent magnet 31 (see FIG. 5). The magnetic shield plate 34 is disposed between the motor 5 and the magnetic sensors 32. The magnetic shield plate 34, which is disposed in this way, blocks magnetism generated from the motor 5 in front of the magnetic sensors 32. This makes it possible to accurately detect the magnetic field that the magnetic sensors 32 are to originally detect (the magnetic field generated from the permanent magnet 31 as the sensor target) and detect position information of the screw shaft 18 without malfunction. Further, in the present invention, the outer peripheral surface 5e of the motor 5 and the inner peripheral surface 34a of the magnetic shield plate 34 face each other with the predetermined radial gap 35 therebetween. According to Coulomb's law, a magnitude of the magnetic field outside the motor 5 is inversely proportional to the square of a distance from a magnetic substance inside the motor 5. This limits a space to be left around the motor 5 and can remarkably enhance a magnetic blocking effect even if the radial gap 35 between the motor 5 and the magnetic shield plate 34 is significantly small (for example, about 1 mm to several mm) as compared with a case where the magnetic shield plate 34 is disposed in close contact with the motor 5. It is therefore possible to effectively reduce an influence of the magnetic field generated from the motor 5 on the magnetic sensors 32 even in an environment in which the components of the electric actuator 1 are disposed close to each other as in the present embodiment. As described above, the present invention makes it possible to control the position of the screw shaft 18 as the actuator head with high accuracy by eliminating the influence of the magnetic field generated by the motor 5 while miniaturizing the electric actuator 1.

Further, in the electric actuator 1 according to the present embodiment, the motor case 6 accommodating the motor 5 and the gear case 10 accommodating the rotary motion transmitter 3 are fixed to each other, the magnetic shield plate 34 is fixed to the inner periphery of the body 61 of the motor case 6, and the one axial end of the motor 5 is fixed to the gear case 10 via the stay 40.

In this way, the magnetic shield plate 34 is fixed to the inner periphery of the body 61 of the motor case 6 accommodating the motor 5, and the one axial end of the motor 5 is fixed to the gear case 10 fixed to the motor case 6 and accommodating the rotary motion transmitter 3. This makes it possible to easily maintain a positional relationship in which the predetermined radial gap 35 is provided between the outer peripheral surface 5e of the motor 5 and the inner peripheral surface 34a of the magnetic shield plate 34 facing each other. That is, in order to fix the motor 5 directly to the body 61 of the motor case 6, a fixed part is to be inevitably provided between the motor 5 and the body 61. However, as in the present configuration, fixing the one axial end of the motor 5 to the gear case 10 adjacent to the body 61 eliminates the need for arranging any configuration fixed to the outer periphery of the motor 5. Therefore, this configuration makes it possible to easily form the predetermined radial gap 35 between the outer peripheral surface 5e of the motor 5 and the inner peripheral surface 34a of the magnetic shield plate 34 facing each other while the motor 5 and the magnetic shield plate 34 are fixed to the cases (the motor case 6 and the gear case 10) of the electric actuator 1.

Although the first embodiment of the present invention has been described above, the present invention is not limited to the above-exemplified embodiment, and any embodiment can be adopted within the scope of the present invention.

Figure 7:
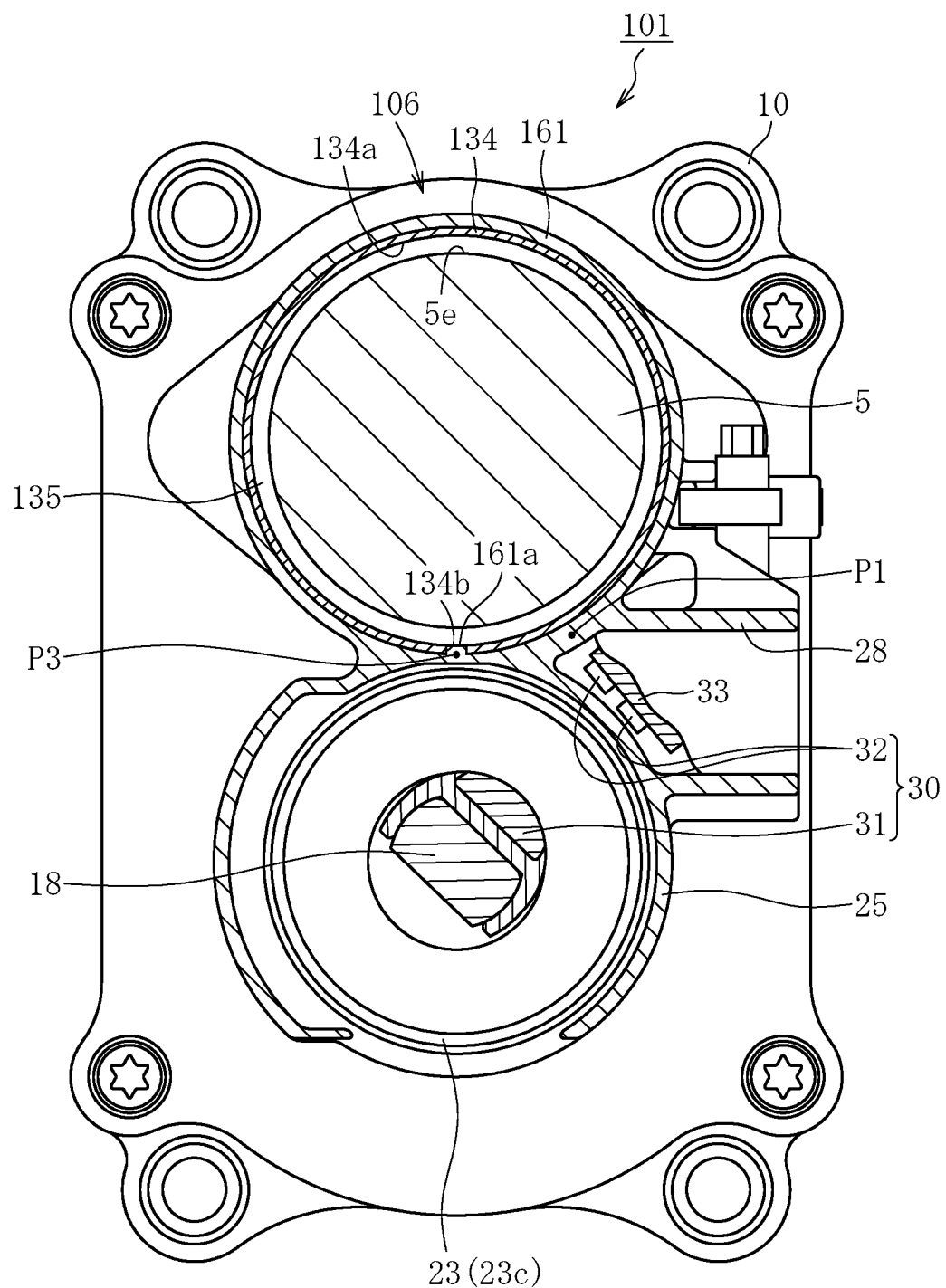
FIG. 7 is a cross sectional view of an electric actuator according to a second embodiment of the present invention.

For example, the first embodiment exemplifies a case where the magnetic shield plate 34 is manufactured separately from the motor case 6 and then the magnetic shield plate 34 is introduced into the inner periphery of the body 61 of the motor case 6 to be fitted and fixed. Alternatively, other embodiments can be taken. FIG. 7 is a cross sectional view of an electric actuator 101 according to an example the other embodiments (second embodiment of the present invention). As shown in FIG. 7, the electric actuator 101 is different from the electric actuator 1 according to the first embodiment (see FIG. 2) in that the electric actuator 101 includes a motor case 106 in which a magnetic shield plate 134 is integrated with a body 161.

Specifically, the body 161 of the motor case 106 is formed by injection-molding resin with the magnetic shield plate 134 as an insert. The magnetic shield plate 134 is embedded in the body 161 such that an inner peripheral surface 134a of the magnetic shield plate 134 is located on an identical cylindrical surface to an inner peripheral surface 161a of the body 161. In this case, the magnetic shield plate 134 has a larger diameter than the magnetic shield plate 34 according to the first embodiment. Consequently, the radial gap 135 formed between the inner peripheral surface 134a of the magnetic shield plate 134 and the outer peripheral surface 5e of the motor 5 is larger than the radial gap 35 according to the first embodiment.

Further, in the present embodiment, a slit 134b of the magnetic shield plate 134 having a cylindrical shape is disposed at a position offset in the circumferential direction from the position between the motor 5 and the magnetic sensors 32 facing each other (a position indicated by P1 in FIG. 7), the position being a relatively thin-walled part P3 of the motor case 106 (here, a connection between the body 161 and the boot cover 25).

As described above, in the electric actuator 101 according to the present embodiment, the body 161 of the motor case 106 is an injection-molded resin product having the magnetic shield plate 134 as an insert. This can omit attachment of the magnetic shield plate 134 to the body 161. Further, in this configuration, the magnetic shield plate 134 can be embedded in the body 161. Thus, a metal cylindrical plate having a diameter larger than that of the magnetic shield plate 34 according to the first embodiment is applicable as the magnetic shield plate 134. As a result, the radial gap 135 between the motor 5 and the magnetic shield plate 134 can be expanded as compared with the first embodiment without increasing an outer diameter dimension of the motor case 106 (body 161). It is therefore possible to more reliably block magnetism generated by the motor 5 and further improve position detection accuracy.

Further, in the present embodiment, the magnetic shield plate 134 having a cylindrical shape is provided with the slit 134b, and the slit 134b is disposed at the relatively thin-walled part P3 of the body 161 of the motor case 106. The motor case 106 including the body 161 is formed as thin as possible in order to miniaturize the electric actuator 101. Thus, when the body 161 is molded with the magnetic shield plate 134 embedded, the flow of the molten resin deteriorates at, for example, the connection between the body 161 and the boot cover 25, and at the part P3 where a wall thickness of the body 161 is relatively small, thereby adversely affecting moldability. In this respect, in the present embodiment, the circumferential position of the slit 134b of the magnetic shield plate 134 coincides with the relatively thin-walled part P3 of the body 161. This can improve the flow of the molten resin in the thin-walled part P3 and enhance the moldability of the body 161.

In the above embodiments, the magnetic shield plate 34, 134 has a cylindrical shape, but the shape of the magnetic shield plate 34, 134 is not limited to this. That is, a magnetic shield plate having an arbitrary shape can be adopted as long as the magnetic shield plate is disposed between the motor 5 and the magnetic sensors 32.

The motion conversion mechanism 4 is not limited to the ball screw mechanism, and may be a sliding screw device. However, the ball screw mechanism is more preferable from a viewpoint of reducing the rotational torque and miniaturizing the motor 5. Further, in the above embodiment, a configuration is illustrated in which a double-row angular contact ball bearing is used as the bearing 14 supporting the motion conversion mechanism 4. However, the present invention is not limited to this configuration, and a pair of single-row angular contact ball bearings may be used in combination. Further, the bearing 14 is not limited to the angular contact ball bearing, but for example, other double-row bearings with deep groove ball bearings or the like can be applied.

Further, in the above description, a case is illustrated where the rotary motion transmitter 3 also functions as a deceleration mechanism by changing the gear ratio between the drive gear 8 and the driven gear 9. However, for example, in addition to the drive gear 8 and the driven gear 9, the deceleration mechanism (not shown) may be provided to decelerate the rotary motion from the motor 5.

The present invention is not limited to the above embodiments, but can be implemented in various embodiments within the scope of the present invention. The scope of the present invention is set forth by the scope of claims, and includes a meaning equivalent to the scope of claims and any modification within the scope of claims.

The invention claimed is:

1. An electric actuator comprising:
a motor; and
a motion conversion mechanism configured to convert a rotary motion generated by driving the motor into a predetermined motion,
wherein the motion conversion mechanism has a movable part configured to perform the predetermined motion,
the movable part is provided with a magnet as a sensor target, and a magnetic sensor configured to detect position information of the magnet is disposed around the magnet,
a magnetic shield plate is disposed between the motor and the magnetic sensor, and
an outer surface of the motor and an inner surface of the magnetic shield plate face each other with a predetermined gap between the outer surface of the motor and the inner surface of the magnetic shield plate.

2. The electric actuator according to claim 1, wherein the magnetic shield plate has a cylindrical shape.

3. The electric actuator according to claim 2,
wherein the magnetic shield plate has a slit axially extending, and
the slit is disposed at a position offset in a circumferential direction from a position between the motor and the magnetic sensor facing each other.

4. The electric actuator according to claim 1, further comprising a rotary motion transmitter configured to transmit the rotary motion from the motor to the motion conversion mechanism,
wherein the motor accommodates a first case and the rotary motion transmitter accommodates a second case, the first case and the second case being fixed to each other, and
the magnetic shield plate is fixed to an inner periphery of the first case, and one axial end of the motor is fixed to the second case.

5. The electric actuator according to claim 1,
wherein the first case accommodating the motor and a third case accommodating the magnetic sensor are integrated, and
the first case fixing the magnetic shield plate to the inner periphery of the first case partially faces an internal space of the third case accommodating the magnetic sensor.

6. The electric actuator according to claim 4, wherein the first case is an injection-molded resin product having the magnetic shield plate as an insert.

7. The electric actuator according to claim 2, further comprising a rotary motion transmitter configured to transmit the rotary motion from the motor to the motion conversion mechanism,
wherein the motor accommodates a first case and the rotary motion transmitter accommodates a second case, the first case and the second case being fixed to each other, and
the magnetic shield plate is fixed to an inner periphery of the first case, and one axial end of the motor is fixed to the second case.

8. The electric actuator according to claim 3, further comprising a rotary motion transmitter configured to transmit the rotary motion from the motor to the motion conversion mechanism,
wherein the motor accommodates a first case and the rotary motion transmitter accommodates a second case, the first case and the second case being fixed to each other, and
the magnetic shield plate is fixed to an inner periphery of the first case, and one axial end of the motor is fixed to the second case.

9. The electric actuator according to claim 2,
wherein the first case accommodating the motor and a third case accommodating the magnetic sensor are integrated, and
the first case fixing the magnetic shield plate to the inner periphery of the first case partially faces an internal space of the third case accommodating the magnetic sensor.

10. The electric actuator according to claim 3,
wherein the first case accommodating the motor and a third case accommodating the magnetic sensor are integrated, and
the first case fixing the magnetic shield plate to the inner periphery of the first case partially faces an internal space of the third case accommodating the magnetic sensor.

11. The electric actuator according to claim 4,
wherein the first case accommodating the motor and a third case accommodating the magnetic sensor are integrated, and the first case fixing the magnetic shield plate to the inner periphery of the first case partially faces an internal space of the third case accommodating the magnetic sensor.

12. The electric actuator according to claim 7,
wherein the first case accommodating the motor and a third case accommodating the magnetic sensor are integrated, and
the first case fixing the magnetic shield plate to the inner periphery of the first case partially faces an internal space of the third case accommodating the magnetic sensor.

13. The electric actuator according to claim 8,
wherein the first case accommodating the motor and a third case accommodating the magnetic sensor are integrated, and
the first case fixing the magnetic shield plate to the inner periphery of the first case partially faces an internal space of the third case accommodating the magnetic sensor.

14. The electric actuator according to claim 5, wherein the first case is an injection-molded resin product having the magnetic shield plate as an insert.

15. The electric actuator according to claim 9, wherein the first case is an injection-molded resin product having the magnetic shield plate as an insert.

16. The electric actuator according to claim 10, wherein the first case is an injection-molded resin product having the magnetic shield plate as an insert.

17. The electric actuator according to claim 11, wherein the first case is an injection-molded resin product having the magnetic shield plate as an insert.

18. The electric actuator according to claim 12, wherein the first case is an injection-molded resin product having the magnetic shield plate as an insert.

19. The electric actuator according to claim 13, wherein the first case is an injection-molded resin product having the magnetic shield plate as an insert.

\* \* \* \* \*